(12) United States Patent
Shyha

(10) Patent No.: US 11,000,902 B2
(45) Date of Patent: May 11, 2021

(54) COMPOSITE MACHINING TOOL

(71) Applicant: University of Northumbria at Newcastle, Newcastle upon Tyne (GB)

(72) Inventor: Islam Shyha, Newcastle upon Tyne (GB)

(73) Assignee: UNIVERSITY OF NORTHUMBRIA AT NEWCASTLE, Newcastle Upon Tyne (GB)

(*) Notice: Subject to any disclaimer, the term of this patent is extended or adjusted under 35 U.S.C. 154(b) by 362 days.

(21) Appl. No.: 16/061,244

(22) PCT Filed: Dec. 8, 2016

(86) PCT No.: PCT/GB2016/053855
§ 371 (c)(1),
(2) Date: Jun. 11, 2018

(87) PCT Pub. No.: WO2017/098242
PCT Pub. Date: Jun. 15, 2017

(65) Prior Publication Data
US 2018/0361484 A1    Dec. 20, 2018

(30) Foreign Application Priority Data

Dec. 9, 2015    (GB) .................................... 1521706

(51) Int. Cl.
| B23B 27/02 | (2006.01) |
| B23B 1/00 | (2006.01) |
| B23B 51/08 | (2006.01) |
| B23P 23/02 | (2006.01) |
| B24D 5/02 | (2006.01) |

(Continued)

(52) U.S. Cl.
CPC .............. *B23B 27/02* (2013.01); *B23B 27/00* (2013.01); *B23B 51/08* (2013.01); *B23C 5/00* (2013.01);
(Continued)

(58) Field of Classification Search
CPC ......... B23B 27/02; B23B 27/00; B23B 51/08; B23B 2226/27; B23C 5/00; B23C 5/04;
(Continued)

(56) References Cited

U.S. PATENT DOCUMENTS 5,160,232 A    11/1992    Maier

FOREIGN PATENT DOCUMENTS

| DE | 20 2006 014 089 | 2/2007 |
| DE | 10 2013 000 942 | 3/2014 |

(Continued)

OTHER PUBLICATIONS

Great Britain Search Report dated May 18, 2017 issued in Great Britain Patent Application No. 1521706.0, 3 pp.
(Continued)

*Primary Examiner* — Joseph J Hail
*Assistant Examiner* — J Stephen Taylor
(74) *Attorney, Agent, or Firm* — Nixon & Vanderhye P.C.

(57) ABSTRACT

A composite machining tool includes a tool body with at least one cutting edge and at least one grinding region. The grinding region is located adjacent to the cutting edge such that there is a gap between the grinding region and the cutting edge and such that when the tool performs a machining action the cutting edge and the grinding region act together on a material surface.

12 Claims, 7 Drawing Sheets

(51) Int. Cl.
- *B24D 5/12* (2006.01)
- *B24D 5/14* (2006.01)
- *B24D 18/00* (2006.01)
- *B24D 99/00* (2010.01)
- *B24B 1/00* (2006.01)
- *B23C 5/00* (2006.01)
- *B23B 27/00* (2006.01)
- *B23C 5/04* (2006.01)

(52) U.S. Cl.
CPC ............... *B23C 5/04* (2013.01); *B23P 23/02* (2013.01); *B24B 1/00* (2013.01); *B24D 5/02* (2013.01); *B24D 5/12* (2013.01); *B24D 5/14* (2013.01); *B24D 18/0018* (2013.01); *B24D 99/005* (2013.01); *B23B 2226/27* (2013.01); *B23C 2226/27* (2013.01)

(58) Field of Classification Search
CPC ....... B23C 2226/27; B23P 23/02; B24B 1/00; B24D 5/02; B24D 5/12; B24D 5/14; B24D 18/0018; B24D 99/005
See application file for complete search history.

(56) References Cited

FOREIGN PATENT DOCUMENTS

| | | |
|---|---|---|
| DE | 102013000942 A1 * | 3/2014 |
| EP | 2 599 569 | 6/2013 |
| JP | 53-41885 | 4/1978 |
| JP | 57-21214 | 2/1982 |
| JP | 59-132761 | 9/1984 |
| JP | 1-175166 | 12/1989 |
| JP | 3-40017 | 4/1991 |
| JP | 2007-216318 | 8/2007 |
| JP | 2011-218486 | 11/2011 |

OTHER PUBLICATIONS

International Search Report dated Feb. 20, 2017 issued in PCT International Patent Application No. PCT/GB2016/053855, 2 pp.
Japanese Office Action dated Jan. 18, 2021 issued in Japanese Patent Application No. 2018-549632 and English translation, 23 pp.

* cited by examiner

COMPOSITE MACHINING TOOL

This application is the U.S. national phase of International Application No. PCT/GB2016/053855 filed Dec. 8, 2016 which designated the U.S. and claims priority to Great Britain Patent Application No. 1521706.0 filed Dec. 9, 2015, the entire contents of each of which are hereby incorporated by reference.

TECHNICAL FIELD

This invention relates to the field of composite machining tools.

BACKGROUND

Polymer Matrix Composite (PMC) materials have become increasingly important in many demanding fields of engineering. PMCs are typically made up of a matrix component—a polymer-based resin, and a reinforcing component—a fibre such as carbon, glass or aramid. It is by combining the complementary mechanical properties of these two components that PMCs can be engineered to suit a wide range of applications. Well known PMC materials are carbon-fibre and glass-fibre reinforced polymer composites, although many other types are in use.

The structure of PMC materials means that they can exhibit a very high strength-to-weight ratio and elastic modulus. This makes them particularly suitable for application in industries where strength and weight are key considerations, such as aerospace, automotive, sports equipment and renewable energy. Many of the industries that use PMCs also demand parts to be produced reliably, with a high quality of surface finish and to within extremely fine tolerances.

The high strength, high elastic modulus and physical structure of PMC materials, while vital to their application, do present difficulties during part manufacture. When subjected to machining with existing tools, PMC materials are often found to be difficult to cut, abrasive to tooling and susceptible to delamination and splintering. This leads to part irregularity and poor finish quality which is unacceptable in many of the most demanding applications.

In order to generate high quality components, current machining technology has to rely on a separate finishing process, which is carried out with different tooling and usually on an entirely different machine. This reduces the speed of manufacture and cost effectiveness of PMC materials and is a barrier to their wider use.

It is known to coat the surface of existing tooling with small particles in the hope that they may act as an abrasive. This approach has been found to be unsatisfactory because the presence of an abrasive on a cutting region of the tool prevents the cutting action from being performed properly and can potentially cause high levels of tool wear.

It is an aim of the present invention to at least partly mitigate the above-mentioned problems.

SUMMARY OF INVENTION

According to a first aspect of the present invention there is provided a composite machining tool comprising: a tool body with at least one cutting edge and at least one grinding region, wherein the grinding region is located adjacent to the cutting edge such that there is a gap between the grinding region and the cutting edge and such that when the tool performs a machining action the cutting edge and the grinding region act together on a material surface.

In accordance with certain aspects of the present invention there is provided a tool that can be used to machine a composite material to a high finish quality in a single action. This is in contrast with existing machining techniques that require separate tooling. Using a tool in accordance with aspects of the invention can provide a machined material with a high level of dimensional accuracy while reducing the number of separate tools required. Using a single tool can improve the dimensional accuracy of the machined material by reducing errors that arise when positioning for additional machining processes. Using a single tool can also reduce the tool changing and setup time.

Optionally, the cutting edge is located on a leading portion of the tool body and the grinding region is located on a trailing portion of the tool body.

Optionally, the gap between the cutting edge and the grinding region is between 0.5 mm and 2 mm in length.

Optionally, the grinding region is positioned on the tool body such that it increases in depth in a direction away from the cutting edge.

Optionally, the tool comprises one or more further cutting edges and/or one or more further grinding regions.

Optionally, the grinding region is made from polycrystalline diamond fine abrasives or cubic boron nitride fine abrasives.

Optionally, the grinding region is deposited on the tool body by electroplating.

Optionally, the electroplating is a single layer electroplating.

Optionally, the electroplating is multi-layer electroplating.

Optionally, the tool is a tool suitable for use in turning, shaping, broaching, drilling or milling processes.

According to a second aspect of the present invention there is provided a method of machining composites, comprising: applying a tool according to the first aspect of the present invention to a composite material such that when the tool performs a machining action on the composite material, a cutting edge and a grinding region of the tool act together on a surface of the composite material.

Optionally, the method further comprises the step of rotating the composite material about its axis to effect the machining action.

Optionally, the method of machining composites comprises turning, shaping, broaching, drilling or milling.

Various aspects and features of the invention are defined in the claims.

BRIEF DESCRIPTION OF DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
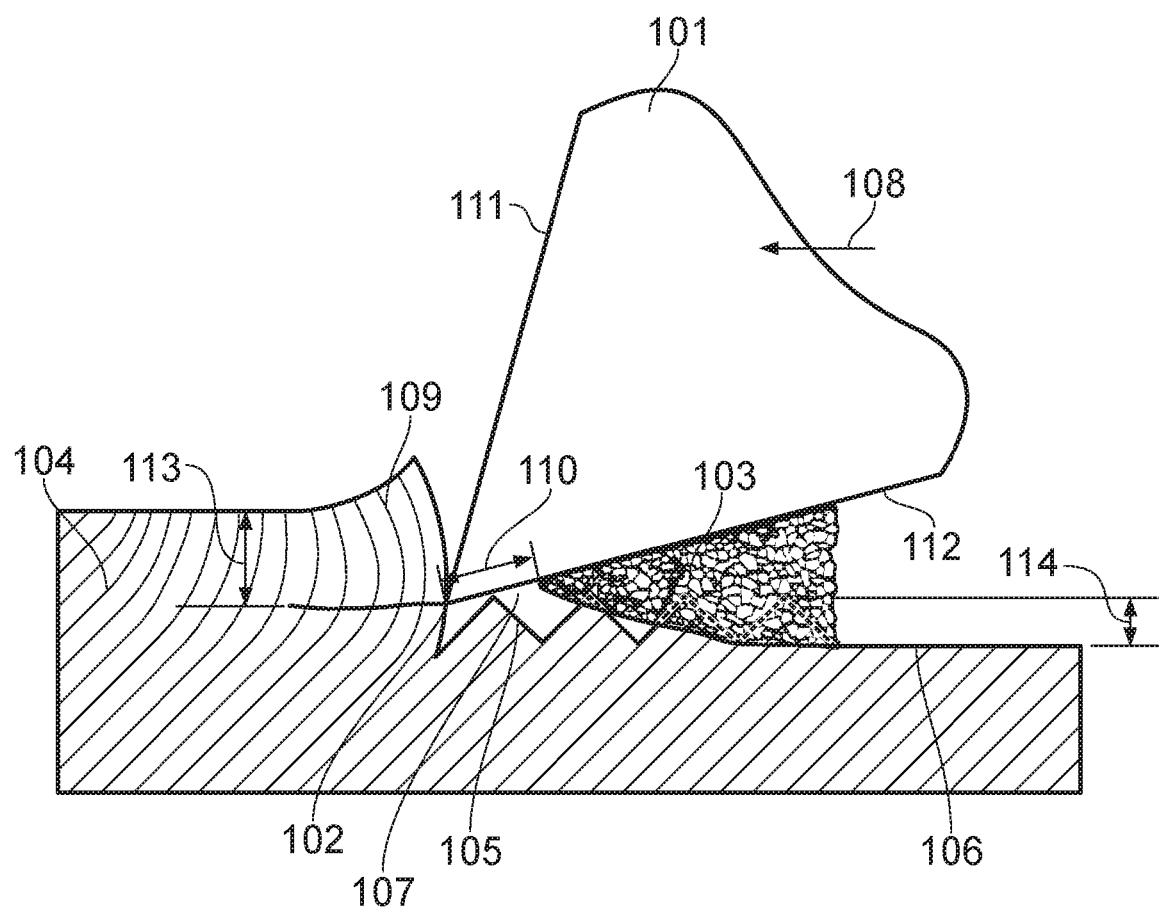
FIG. 1 illustrates a section of composite material in the process of machining in accordance with certain embodiments of the invention.

FIG. 1 provides a schematic diagram illustrating a section of composite material in the process of machining in accordance with certain embodiments of the invention. The types of materials that can be machined by the invention include Polymer Matrix Composite (PMC) materials such as carbon-fibre and glass-fibre reinforced polymer composites, and so on. These materials will be referred to henceforth as composite materials.

The tool body 101 comprises a cutting edge 102 and a grinding region 103. The cutting edge 102 is formed at the intersection between a first and second surface 111,112 of the tool body 101. The grinding region 103 is located on the second surface 112 of the tool body 101 and is adjacent to the cutting edge 102. The second surface 112 is commonly known as the clearance surface. The grinding region 103 is characterised in that it is abrasive to composite materials. The cutting edge 102 and grinding region 103 are positioned on the tool body 101 such that a gap 110 is formed between the cutting edge 102 and the grinding region 103. The gap 110 region of the tool surface may not be entirely free from abrasive material. However, abrasive material that is present in the gap region may not have a substantial abrasive effect in any machining action performed by the tool. The length of the gap 110 may be very small in relation to the length of the grinding region.

A machining action as illustrated in FIG. 1 will now be described in more detail. The tool body 101 moves through a portion of composite material 104 in the direction indicated by the arrow 108. The relative motion between the tool body 101 and the composite material 104 can result from moving the tool body 101 itself, the composite material 104, or a combination of both. The motion of the tool body 101 and/or composite material 104 may be rotational and/or translational.

During machining, the cutting edge 102 constitutes a leading part of the tool body 101 and the grinding region 103 constitutes a trailing part of the tool body 101. The tool body 101 is oriented such that, during machining, the cutting edge 102 and the grinding region 103 can both make contact with the composite material 104. The tool body 101 is positioned in such a way that, because of the presence of the gap 110 between the cutting edge 102 and the grinding region 103 and the presence of a positive clearance angle between the tool surface and the material, a space 107 is formed.

Due to its shape and orientation, moving the cutting edge 102 through the composite material 104 causes a cutting action in which a portion 113 of the composite material 104 is removed. In this way, the action of the cutting edge 102 on the composite material 104 is similar to the action of conventional tooling. The material that is removed in the cutting process forms a chip 109 ahead of the tool body 101, however, unlike when ductile materials like metals are machined, the chip 109 formed when machining composite materials is typically irregular and may consist substantially of dust and debris. The action of the cutting edge 102 removing a portion of material 113 from the composite material 104 forms a cut surface 105. Because of the properties of PMC materials, the cut surface 105 is typically of a low surface quality, being irregular and uneven.

As described, during machining the grinding region 103 of the tool body 101 can make contact with the cut surface 105. Because of the abrasive nature of the grinding region 105 and the presence of a relative motion between the composite material 104 and the grinding region 103, a grinding action is effected on the cut surface 105 in which a portion 114 of material is removed from the cut surface 105. The portion 114 of material removed by the grinding action is typically less than the portion 113 of material removed by the cutting action.

The presence of the space 107 (formed by the gap 110 and the positive clearance angle of the tool) ahead of the grinding region 103 (and behind the cutting edge 102) has several benefits. It allows material that is removed by the grinding region 103 (from the cut surface 105) to form a chip of dust and debris within the space 107 without being restricted, in a process similar to that described for the cutting edge 102 (although typically with a smaller chip). The gap 110 ensures that the initial cutting action can take place while avoiding sudden cutting or grinding actions on the material. The presence of the gap 110 can also make it easier to locate and/or deposit the abrasive on the tool body 101. The space 107 allows material that is removed during machining to gather, before emptying once contact between the tool and material has been removed.

The grinding action leads to the formation of a ground surface 106 which has an improved quality of finish and regularity compared to the cut surface 105.

The combined action of the tool negates the need to perform separate cutting and grinding processes in order to achieve component regularity and surface finish quality that is desirable in many PMC applications. This can reduce tooling costs, since only one tool is required. Using a single machining process can also increase the speed of part manufacture.

While FIG. 1 illustrates a sectional view of a portion of a tool performing a machining action, it will be appreciated that embodiments of the present invention are applicable to both single point and multi point cutting tools (i.e. tools with one or more than one cutting edge).

As will be understood, certain embodiments of the composite tool and method are suitable for use in turning, shaping, broaching, drilling and milling operations, as well as other machining operations that use machining tools with a definite number and geometry of cutting edges.

Figure 2:
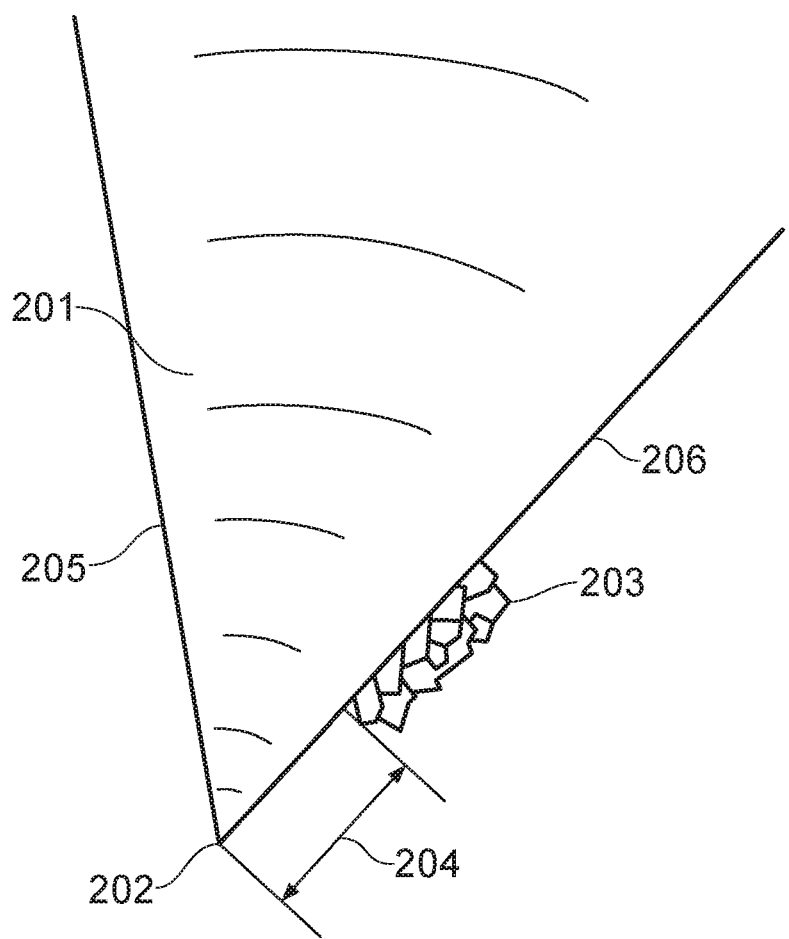
FIG. 2 illustrates a machining tool in accordance with certain embodiments of the invention.

FIG. 2 provides a schematic diagram illustrating an example of a tool in accordance with certain embodiments of the present invention.

The tool may be fixed in a machine such as a type commonly used for the machining of composite materials. The tool body 201 may be part of a tool with a single cutting edge and grinding region or a plurality of cutting edges and grinding regions.

The tool body 201 includes a cutting edge 202 and a grinding region 203. The cutting edge 202 is formed at the intersection between a first and second surface 205, 206 of the tool body 201. The tool body 201 may be made from a conventional tool material such as high speed steel (HSS).

The grinding region 203 is located on the second surface 206 of the tool body 201 and is adjacent to the cutting edge 202. The grinding region 203 is characterised in that it is abrasive to composite materials. The grinding region 203 may be made from a material such as polycrystalline diamond fine abrasives or cubic boron nitride fine abrasives, or another suitable abrasive material. The grinding region 203 may be deposited on the second surface 206 of the tool body 201 by electroplating or another suitable process depending on the abrasive material. The cutting edge 202 and grinding region 203 are positioned on the tool body 201 such that a gap 204 is formed between the cutting edge 202 and the grinding region 203. The gap 204 region of the tool surface 206 may not be entirely free from abrasive material. However, abrasive material that is present in the gap region may not have a substantial abrasive effect in any machining action performed by the tool. The presence of abrasive material in the gap region 204 may be as a result of the deposition process. The length of the gap 204 between the cutting edge 202 and the grinding region 203 may be very small in relation to the length of the grinding region 203. The length of the gap 204 may vary in size depending on the type and size of the tool but will typically be between 0.5 mm and 2 mm in length.

In certain examples, the grinding region may be deposited in one (a single) layer. In other examples, the grinding region may be deposited in multiple layers. Accordingly, in some examples where electroplating is used to deposit the grinding region, the electroplating is single layer electroplating. In other examples, the electroplating is multi-layer electroplating.

Figure 3:
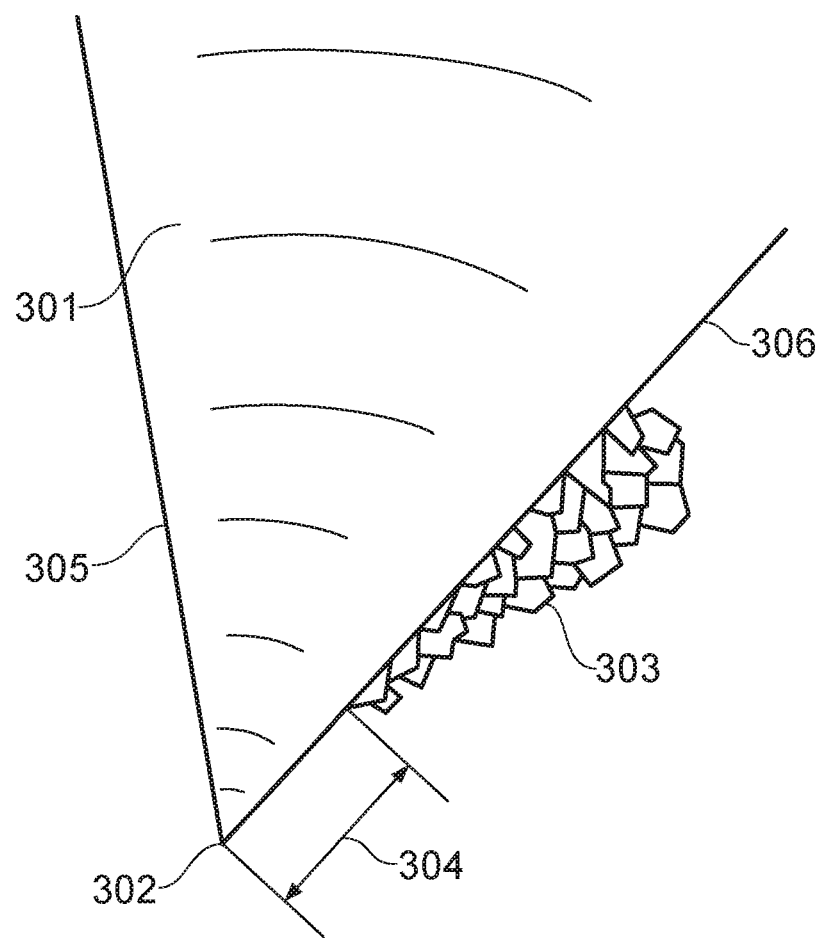
FIG. 3 illustrates a machining tool with a graduated grinding region in accordance with certain embodiments of the invention.

FIG. 3 provides a schematic diagram illustrating an example of a tool in accordance with certain embodiments of the present invention.

The tool may be fixed in a machine such as a type commonly used for the machining of composite materials. The tool body 301 may be part of a tool with a single cutting edge and grinding region or a plurality of cutting edges and grinding regions.

The tool body 301 includes a cutting edge 302 and a grinding region 303. The cutting edge 302 is formed at the intersection between a first and second surface 305, 306 of the tool body 301. The tool body 301 may be made from a conventional tool material such as high speed steel (HSS).

As will be understood, any suitable tool material can be used. In certain embodiments, the tool body may be made from other conventional tool materials such as tungsten carbide.

The grinding region 303 is located on a second surface 306 of the tool body 301 and is adjacent to the cutting edge 302. The grinding region 303 is characterised in that it is abrasive to composite materials. The grinding region 303 may be made from a material such as polycrystalline diamond fine abrasives or cubic boron nitride fine abrasives or other suitable abrasives. The grinding region 303 may be deposited on the second surface 306 of the tool body 301 by a process such as electroplating. The cutting edge 302 and grinding region 303 are positioned on the tool body 301 such that a gap 304 is formed between the cutting edge 302 and the grinding region 303. The gap 304 region of the tool surface may not be entirely free from abrasive material. However, abrasive material that is present in the gap 304 region may not have a substantial abrasive effect in any machining action performed by the tool. The presence of abrasive material in the gap 304 region may be as a result of the deposition process described previously. The length of the gap 304 between the cutting edge 302 and the grinding region 303 may be very small in relation to the length of the grinding region 304. The gap 304 may be of a range of sizes depending on the type and size of tool, but will typically be between 0.5 mm and 2 mm in length.

The grinding region 303 is deposited on the tool body 301 such that the depth of grinding region 303 increases in a direction away from the cutting edge 302. This means that when the tool body 301 is positioned for a machining action (such as the one illustrated in FIG. 1) the grinding region 303 is in contact with a greater surface area of the cut surface 105. This improves the effectiveness of the grinding region.

Figure 4:
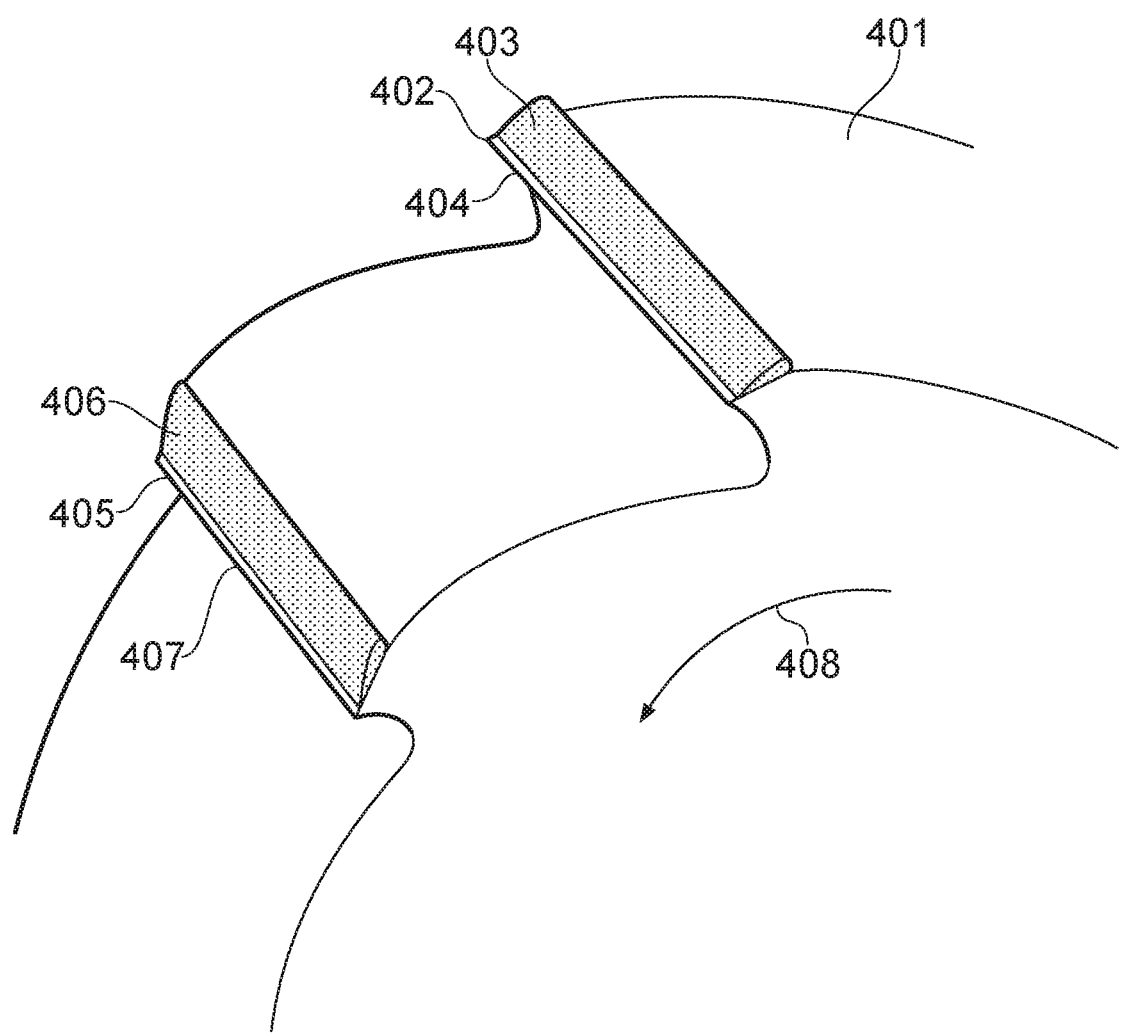
FIG. 4 illustrates a multi edge machining tool in accordance with certain embodiments of the invention.

FIG. 4 provides a schematic diagram illustrating part of a machining tool in accordance with certain embodiments of the present invention. Specifically, FIG. 4 shows part of the tool body of a multi edge cutting tool that can be used to machine composite materials.

Tool body 401 is shown to comprise a first cutting edge 402, a first grinding region 403 and a first gap 404 between the first cutting edge 402 and the first grinding region 403. These features constitute a first machining part. The tool body 401 also comprises a second cutting edge 405, a second grinding region 406 and a second gap 407 between the second cutting edge 405 and the second grinding region 406. These features constitute a second machining part. The length of the first and second gap 404, 407 is very small relative to the length of the grinding region.

During machining, the tool body 401 is rotated about its central axis (not shown). This provides a motion 408 to the tool body 401 relative to a material that is being machined. The tool body or the material is moved so that the cutting edges 402, 405 and the grinding regions 403, 406 come into contact with the material. This motion and contact causes a machining action similar to that described in FIG. 1.

With reference to FIG. 4, it will be understood that, typically, the second cutting edge 405 comes into contact with the material that is to be machined before the first cutting edge 402 when the tool body is moving in the indicated direction of motion 408.

Figure 5:
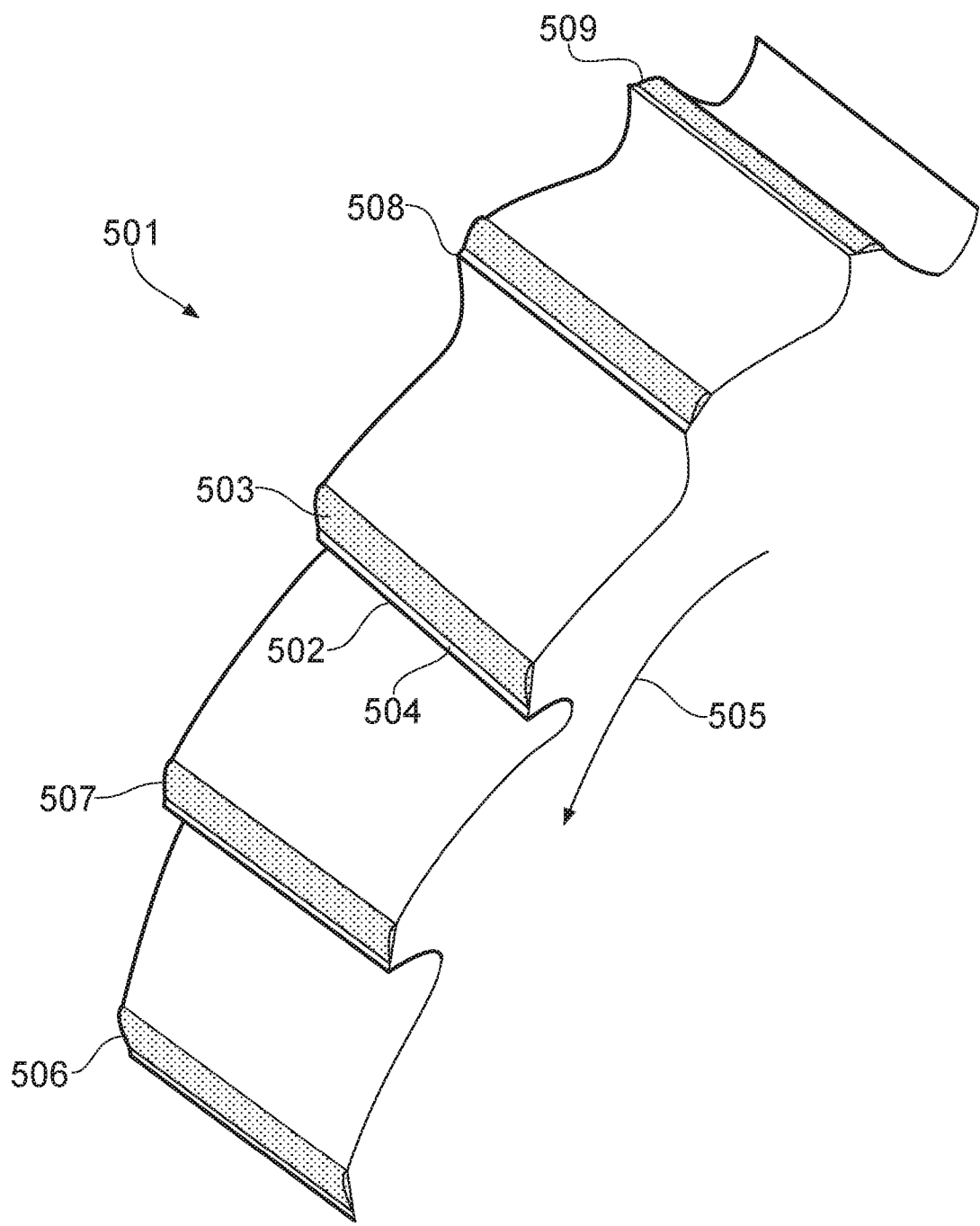
FIG. 5 illustrates an additional view of the multi edge machining tool illustrated in FIG. 4 in accordance with certain embodiments of the invention.

FIG. 5 illustrates an additional view of the machining tool illustrated in FIG. 4. The tool body 501 comprises a first cutting edge 502, a first grinding region 503 and a first gap 504 between the first cutting edge 502 and the first grinding region 503. These features will be referred to as a first machining part. The tool body 501 also comprises four further machining parts 506, 507, 508, 509 that are arranged similarly to the first machining part. During machining the tool body 501 is rotated 505 about its central axis.

Figure 6:
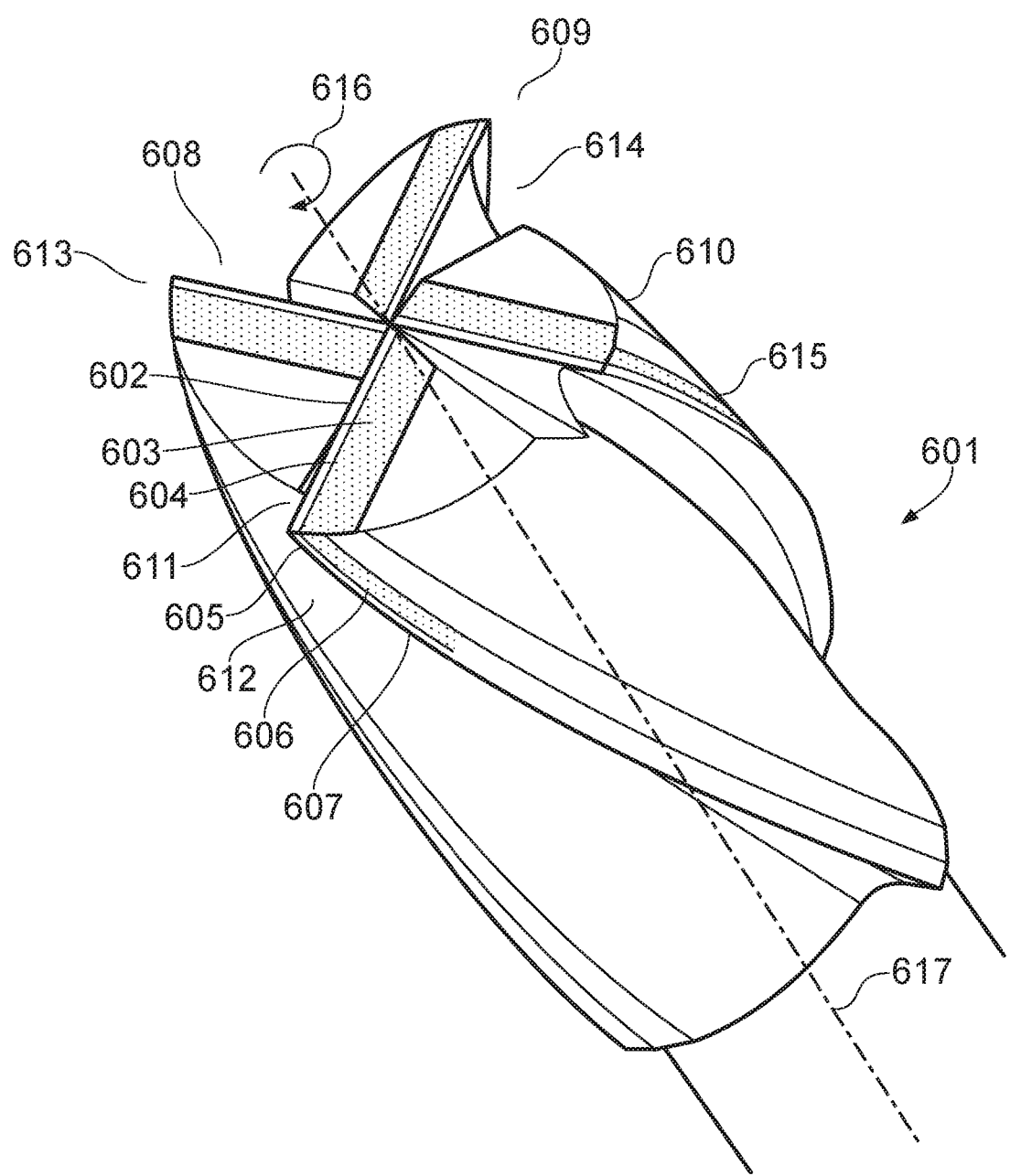
FIG. 6 illustrates an end mill machining tool in accordance with certain embodiments of the invention.

FIG. 6 illustrates a tool in accordance with certain embodiments of the present invention. The tool illustrated in FIG. 6 has a more complex geometry than the tools illustrated in previous Figures, and is often known as an end mill tool. The tool has four main cutting edges and four peripheral cutting edges. Because the main and peripheral cutting edges of an end mill tool are located on parts of the tool body that are at different orientations to each other, the tool can perform machining actions on a material in more than one direction.

The tool body 601 comprises a first main cutting edge 602, a first main grinding region 603 and a first main gap 604 between the first main cutting edge 602 and the first main grinding region 603. This part of the tool body will be referred to as the first main machining part 611. The tool body further comprises a first peripheral cutting edge 605, a first peripheral grinding region 606 and a first peripheral gap 607 between the first peripheral cutting edge 605 and the first peripheral grinding region 606. This part of the tool body will be referred to as the first peripheral machining part 612. The tool body 601 further comprises three additional main machining parts 608, 609, 610 and three additional peripheral machining parts 613, 614, 615, all of which are similar to the first machining parts 611, 612. The length of the main and peripheral gaps is shown to be very small relative to the length of the corresponding grinding regions.

During machining, tool body 601 is rotated 616 around its central axis 617 so that it has a relative motion to a material that is to be machined. The tool body or material is moved so that the main and/or peripheral machining parts of the tool body come into contact with the material and effect a machining action as described in detail in FIG. 1.

Figure 7:
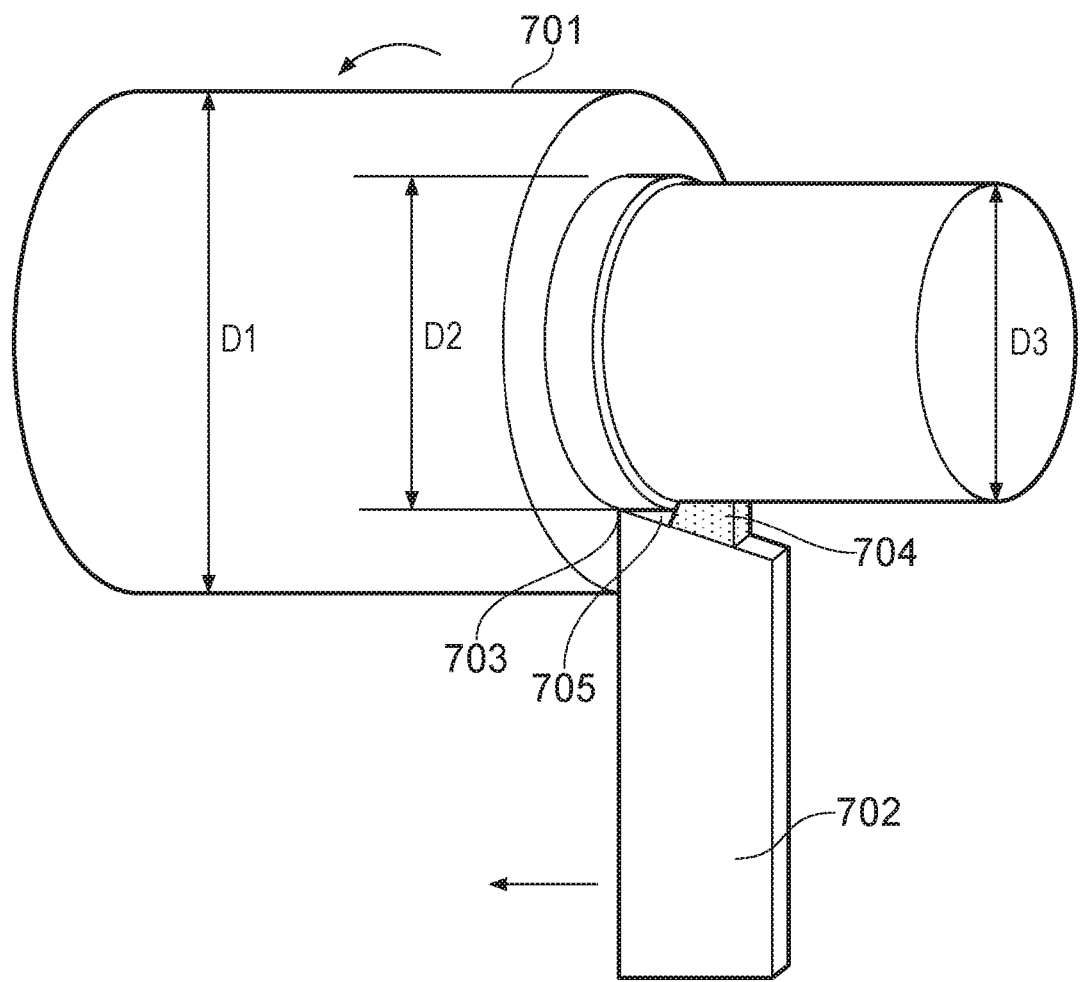
FIG. 7 illustrates a turning tool in accordance with certain embodiments of the invention.

FIG. 7 provides a schematic diagram of a tool in accordance with certain embodiments of the invention. The tool shown in FIG. 7 is a tool for use in a turning process.

A workpiece 701 to be machined is rotated about its axis and a single point tool body 702 is moved in a direction parallel to the axis of workpiece 701 to thereby effect a machining action. The single point tool body includes a cutting edge 703 separated from a grinding region 704 by a gap 705.

As will be understood, the workpiece is any suitable shape, for example a tube or solid cylinder.

An initial diameter D1 of the workpiece 701 is shown, along with an as-cut diameter D2 (i.e. the diameter of the workpiece 701 after the cutting edge 703 has been applied) and a final diameter D3 (i.e. after the grinding region 704 has been applied to the workpiece 701). The workpiece 701 is composed of a composite material.

As will be understood, the turning process illustrated in FIG. 7 may be similar to turning processes known in the art. For example, in certain embodiments the workpiece 701 may remain in a fixed position with the tool body 702 moving relative to the workpiece 701. In other embodiments, the tool body 702 may remain in a fixed position with the workpiece 701 moving relative to the tool body 702. During turning, the tool body 702 and workpiece 701 move relative to each other in order to remove material from the workpiece to generate the desired workpiece shape. This relative motion may include translation in one or more directions (e.g. parallel and/or perpendicular to the workpiece axis of rotation).

It will be understood that the type and configuration of machining tools illustrated in the preceding drawings have been shown for illustrative purposes and the present invention is applicable to any composite machining tool that has at least one cutting edge. Moreover, it will be appreciated that machining tools in accordance with the present invention can vary to encompass alternatives discussed throughout the application and in any of FIGS. 1 to 6.

Where tools are illustrated in isolation, it will be understood that they are not necessarily oriented in their machining position.

It will be understood that in certain embodiments, machining tools in accordance with examples of the invention can be used in cutting processes. In certain embodiments, machining tools in accordance with examples of the invention can be used in planing and boring operations.

It will be understood that machining tools in accordance with embodiments of the invention can be made with any suitable tool material. For example, in certain embodiments, the tool body may be made from conventional tool materials such as tungsten carbide.

Various modifications of the present invention are also disclosed. Embodiments of the invention have been described with reference to pairs of cutting edges and grinding regions working in combination, however it will be appreciated that more than one cutting edge could act in combination with a single grinding region and vice versa. It will also be appreciated that while the tool body and grinding region have been described as being made from a single material, this is not necessarily the case, and various combinations of material may be used.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A composite machining tool comprising:
a tool body with at least one cutting edge and at least one grinding region, wherein the grinding region is located adjacent to the cutting edge such that there is a gap between the grinding region and the cutting edge and such that when the tool performs a machining action the cutting edge and the grinding region act together on a material surface, and wherein the grinding region is positioned on the tool body such that it increases in depth in a direction away from the cutting edge.

2. The composite machining tool of claim 1, wherein the cutting edge is located on a leading portion of the tool body and the grinding region is located on a trailing portion of the tool body.

3. The composite machining tool of claim 1, wherein the gap between the cutting edge and the grinding region is between 0.5 mm and 2 mm in length.

4. The composite machining tool of claim 1, wherein the tool comprises one or more further cutting edges and/or one or more further grinding regions.

5. The composite machining tool of claim 1, wherein the grinding region is made from polycrystalline diamond fine abrasives or cubic boron nitride fine abrasives.

6. The composite machining tool of claim 1, wherein the grinding region is deposited on the tool body by electroplating.

7. The composite machining tool according to claim 6, wherein the electroplating is single layer electroplating.

8. The composite machining tool according to claim 6, wherein the electroplating is multi-layer electroplating.

9. The composite machining tool of claim 1, wherein the composite machining tool is a tool suitable for use in turning, shaping, broaching, drilling or milling processes.

10. A method of machining composites, comprising:
provide a composite machining tool including a tool body with at least one cutting edge and at least one grinding region, wherein the grinding region is located adjacent to the cutting edge such that there is a gap between the grinding region and the cutting edge, and wherein the grinding region is positioned on the tool body such that it increases in depth in a direction away from the cutting edge; and
applying the composite machining tool to a composite material such that when the tool performs a machining action on the composite material, a cutting edge and a grinding region of the tool act together on a surface of the composite material.

11. The method of claim 10, further comprising the step of:
rotating the composite material about its axis to effect the machining action.

12. The method of claim 10, wherein the method of machining composites comprises turning, shaping, broaching, drilling or milling.

\* \* \* \* \*